(12) United States Patent
Weng et al.

(10) Patent No.: US 8,467,174 B2
(45) Date of Patent: Jun. 18, 2013

(54) PORTABLE ELECTRONIC DEVICE WITH FASTENING STRUCTURE

(75) Inventors: Ming-Hsiang Weng, Taipei Hsien (TW); Chih-Wei Chang, Taipei Hsien (TW); Bhoopal Ponnuvelu, Shenzhen (CN)

(73) Assignee: FIH (Hong Kong) Limited, Kowloon (HK)

( * ) Notice: Subject to any disclaimer, the term of this patent is extended or adjusted under 35 U.S.C. 154(b) by 296 days.

(21) Appl. No.: 12/916,675

(22) Filed: Nov. 1, 2010

(65) Prior Publication Data
US 2011/0249377 A1  Oct. 13, 2011

(30) Foreign Application Priority Data
Apr. 7, 2010  (CN) .................. 2010 1 0141098.4

(51) Int. Cl.
*G06F 1/16* (2006.01)
(52) U.S. Cl.
USPC .............. 361/679.01; 455/550.1; 248/449; 312/332.1; 360/97.12

(58) Field of Classification Search
USPC ............ 455/575.1, 575.4, 550.1; 361/679.31, 361/679.32, 679.33, 679.34, 679.26, 679.03, 361/679.55, 679.27, 679.01, 679.11, 679.57, 361/679.08, 679.41; 248/309.1, 452, 176.1, 248/278.1, 160, 288.51, 118.1, 553, 580; 312/236, 237, 223.3, 208.4, 223.2, 327, 332.1, 312/223.1; 165/104.26, 104.33, 104, 21, 165/80.2, 84, 121, 185; 360/245.1, 97.16, 360/99.13, 69, 99.08, 99.16, 97.13, 234, 360/97.12, 110, 113, 245, 97.15
See application file for complete search history.

(56) References Cited

U.S. PATENT DOCUMENTS

| | | | |
|---|---|---|---|
| 7,639,490 B2 * | 12/2009 | Qin et al. ................. | 361/679.34 |
| 7,643,857 B2 * | 1/2010 | Yang et al. ................ | 455/575.4 |
| 2011/0139952 A1 * | 6/2011 | Chang et al. ............... | 248/309.1 |

* cited by examiner

*Primary Examiner* — Hung Duong
(74) *Attorney, Agent, or Firm* — Altis Law Group, Inc.

(57) ABSTRACT

A fastening structure for a portable electronic device includes a main housing and a frame. The main housing defines a slot. A protrusion and a block are formed at two opposite sides of the slot. The frame includes a tab. The tab defines a locking hole. The block pushes the tab toward the protrusion to allow the protrusion to be latched in the locking hole for connecting the frame to the main housing.

19 Claims, 6 Drawing Sheets

PORTABLE ELECTRONIC DEVICE WITH FASTENING STRUCTURE

BACKGROUND

1. Technical Field

The exemplary disclosure generally relates to a fastening structure used in a portable electronic device.

2. Description of Related Art

In assembling electronic devices, many subsidiary pieces need to be secured to a main housing of the electronic device. A typical method uses screws to fasten the subsidiary piece to the main housing. However, because most of the subsidiary pieces are thin and usually made of plastic, and due to the fragile nature of plastic, it is difficult to maintain a tight engagement between the subsidiary pieces and the main housing with screws.

Therefore, there is room for improvement within the art.

BRIEF DESCRIPTION OF THE DRAWINGS

Many aspects of the fastening structure can be better understood with reference to the following drawings. The components in the drawings are not necessarily drawn to scale, the emphasis instead being placed upon clearly illustrating the principles of the fastening structure.

DETAILED DESCRIPTION

Figure 1:
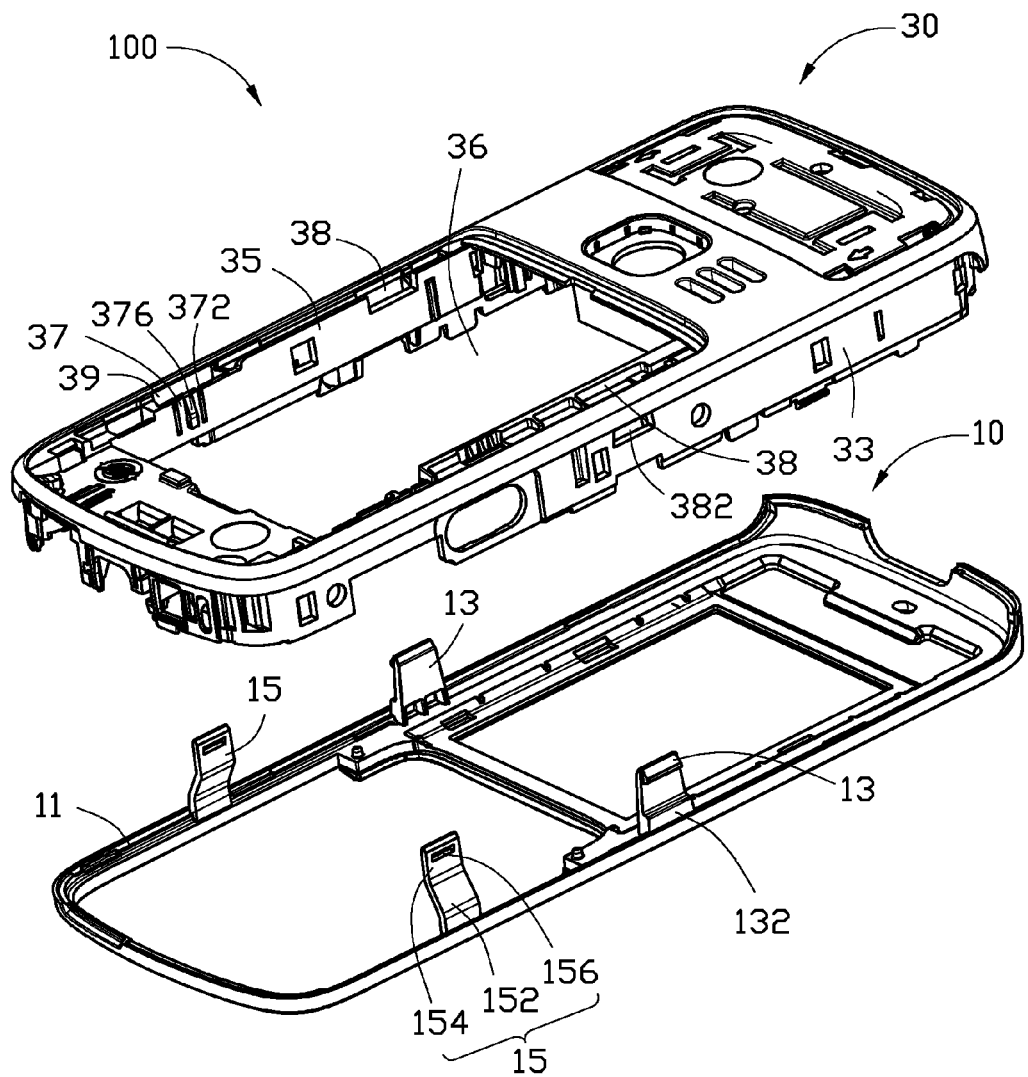
FIG. 1 is an exploded, isometric view of a portable electronic device with a fastening structure, in accordance with an exemplary embodiment.

FIG. 1 shows an exemplary embodiment of a portable electronic device 100 with a fastening structure (not labeled). The portable electronic device 100 includes a frame 10 and a main housing 30.

Each side of the frame 10 includes at least one hook 13 and at least one tab 15. A bar 132 is formed at a bottom of each hook 13 for limiting movement of the hook 13 during assembly. Each tab 15 includes an oblique portion 152 and a straight portion 154 connected to each other. Each straight portion 154 defines a locking hole 156.

Figure 2:
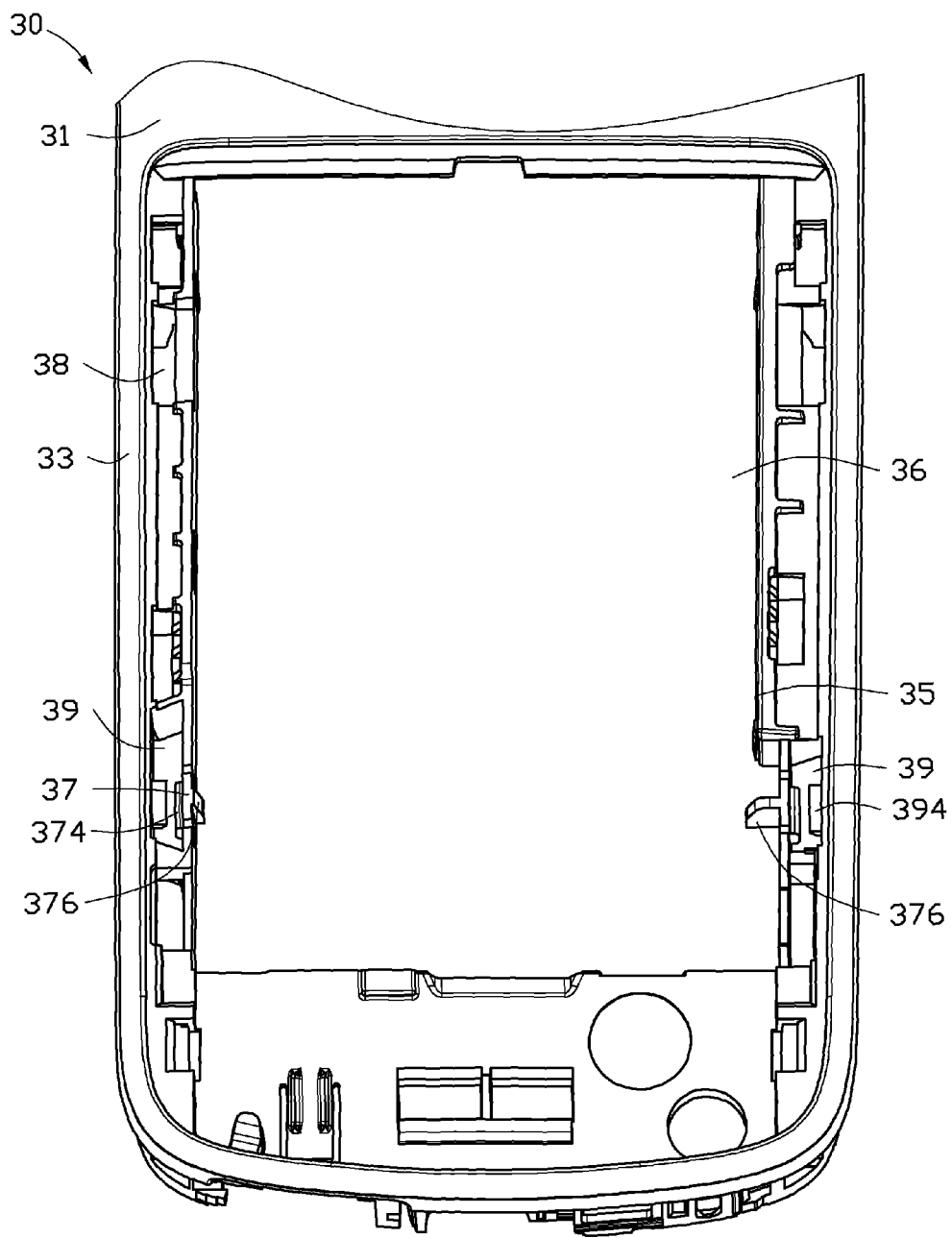
FIG. 2 is an isometric view of a main housing of the portable electronic device shown in FIG. 1.
Figure 3:
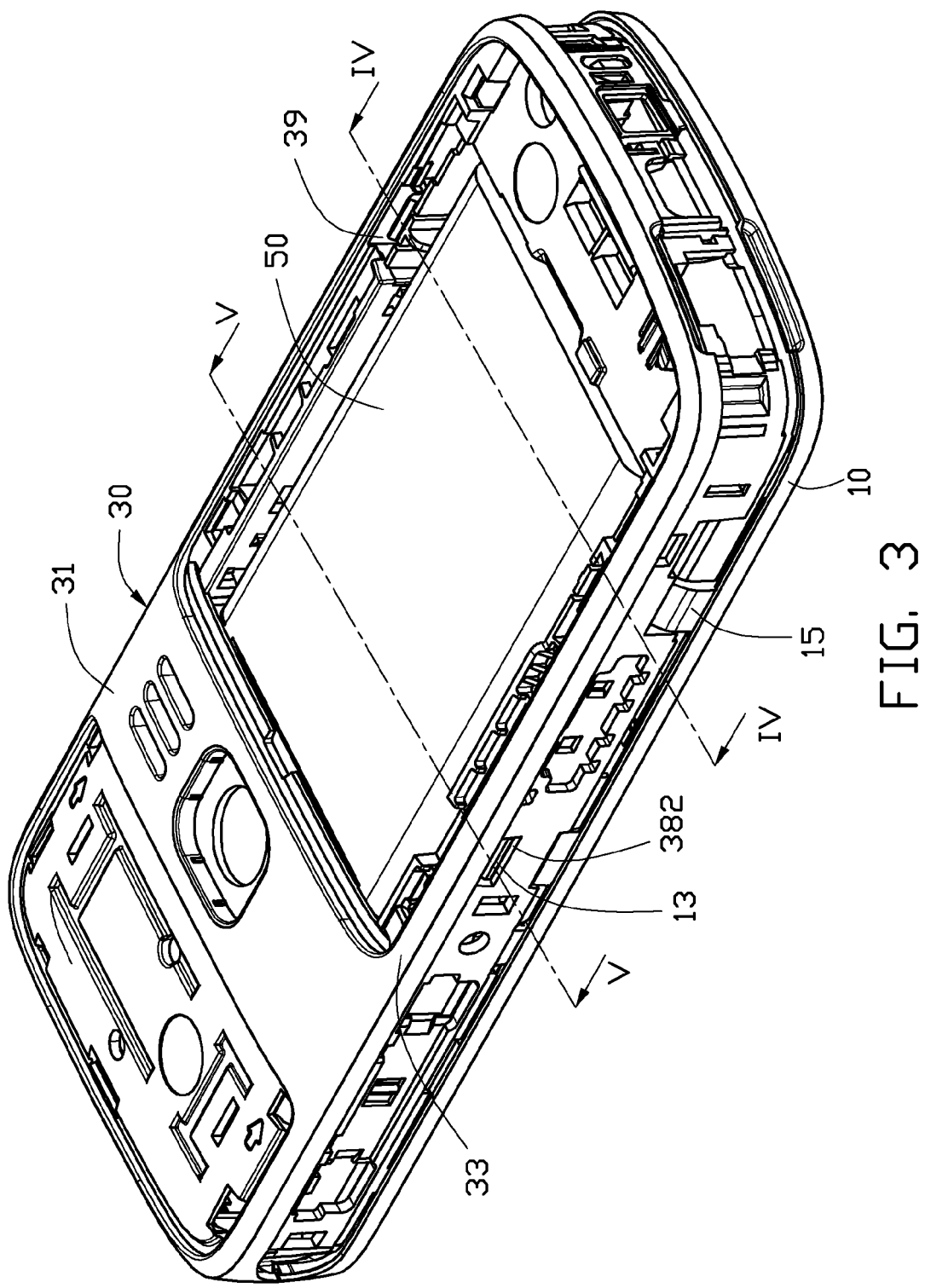
FIG. 3 is an assembled, isometric view of the portable electronic device shown in FIG. 1.
Figure 4:
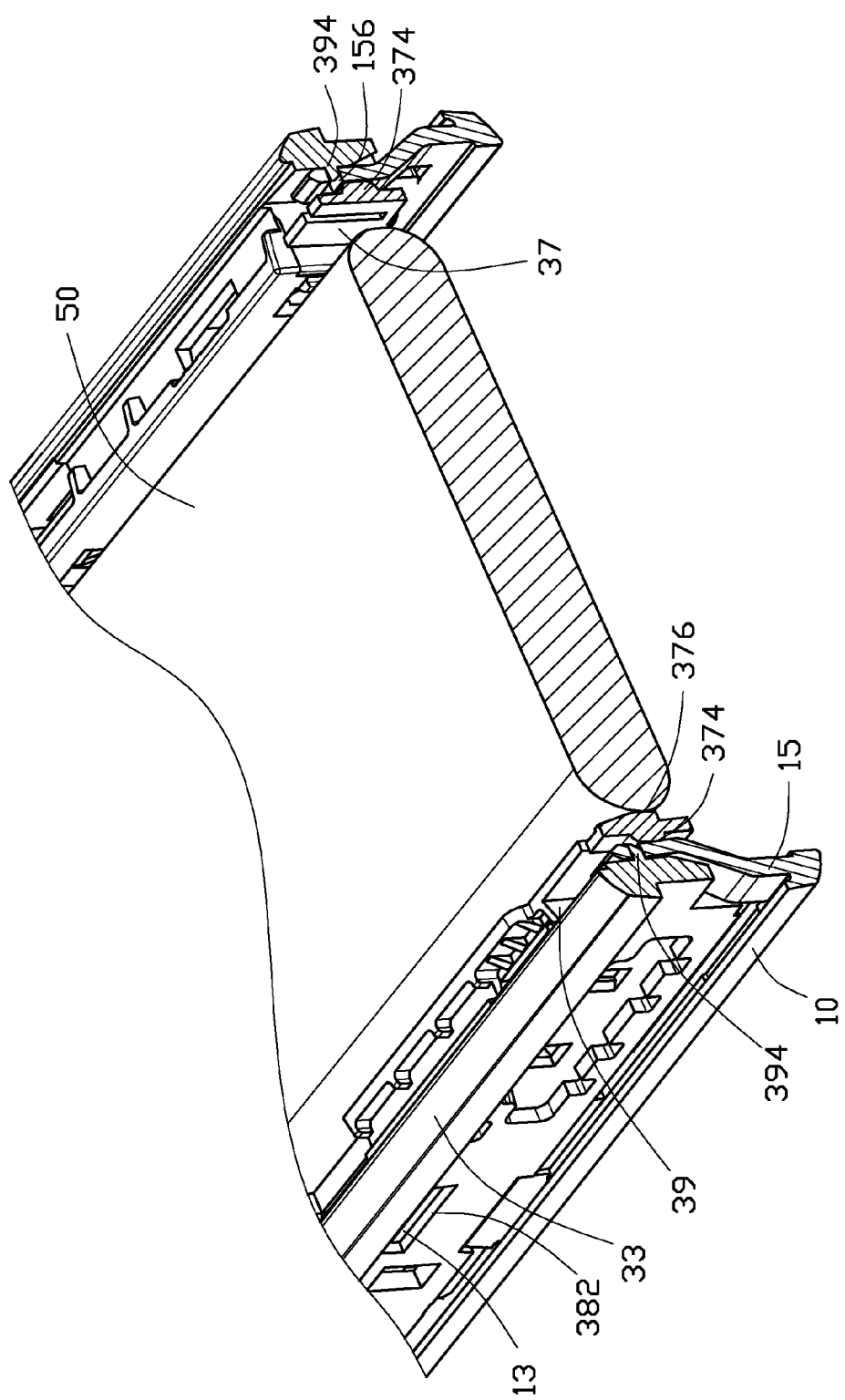
FIG. 4 is a cross section view taken along line IV-IV of FIG. 3, showing a battery attached to the portable electronic device.
Figure 5:
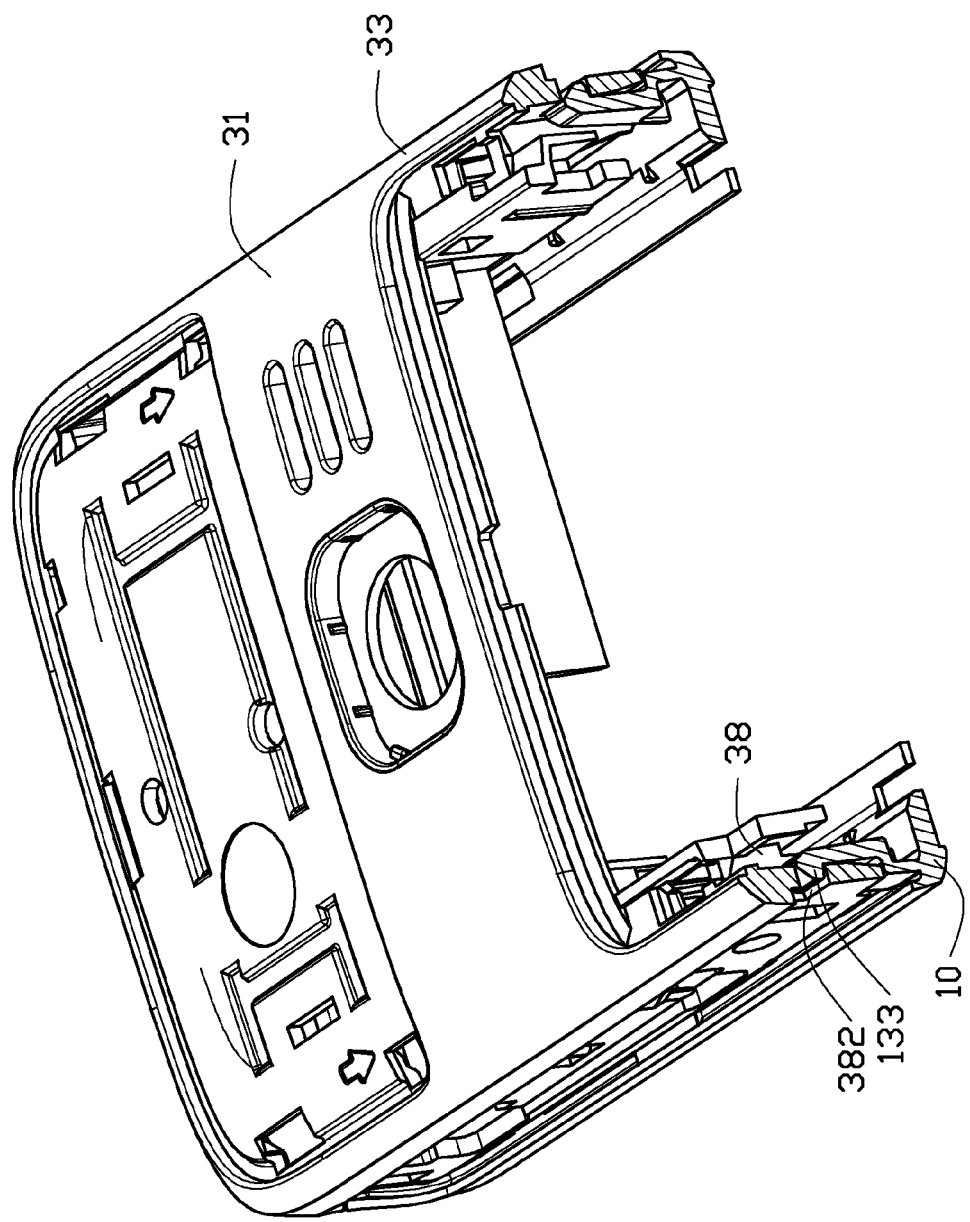
FIG. 5 is a cross section view taken along line V-V of FIG. 3.
Figure 6:
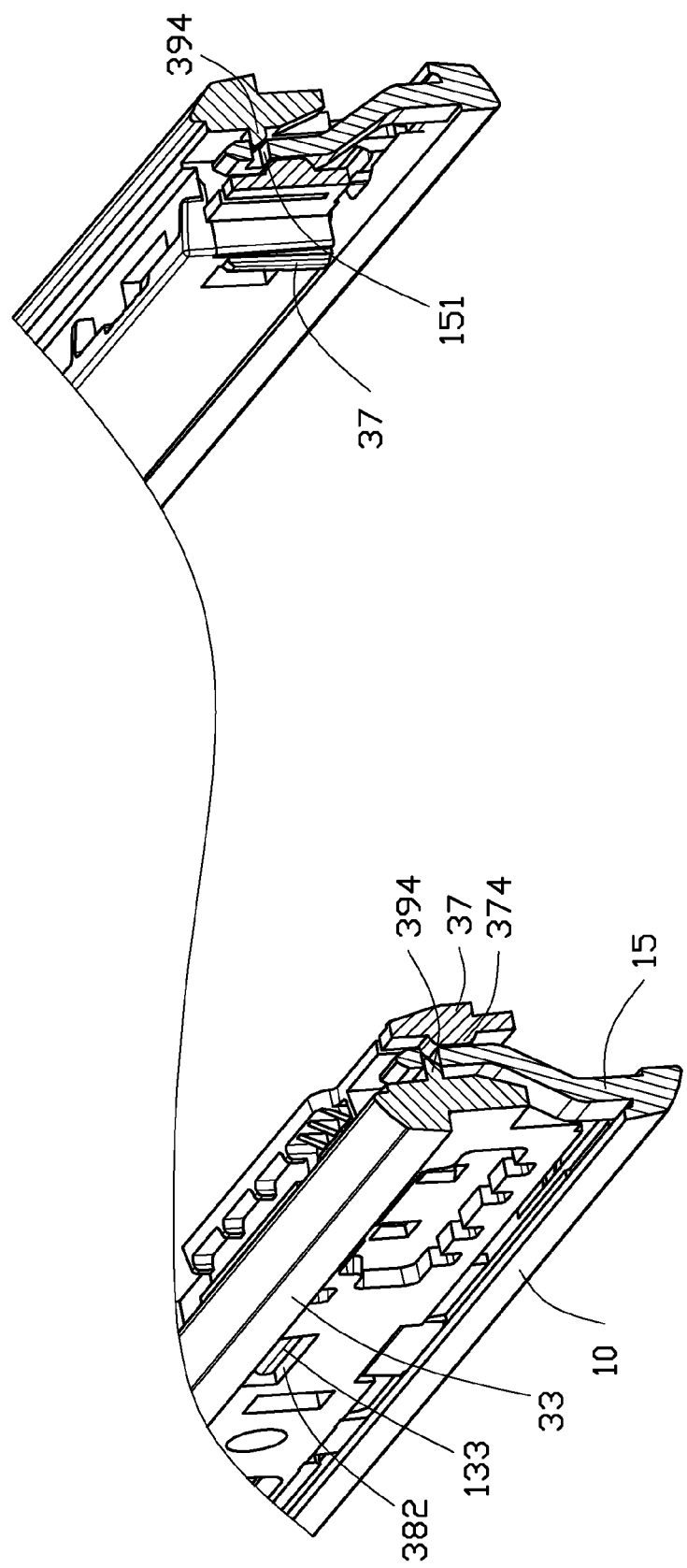
FIG. 6 is similar to FIG. 4, but showing the portable electronic device without the battery.

Referring to FIGS. 2 and 3, the main housing 30 includes two opposite sidewalls 33 and a battery cavity 36 for receiving a battery 50. A side plate 35 is adjacent to each of the sidewalls 33 surrounding the battery cavity 36. A groove 38 and a slot 39 are defined between the side plate 35 and the adjacent sidewall 33. Each sidewall 33 defines a through hole 382 perpendicular to and communicating with a corresponding groove 38. The groove 38 allows a corresponding hook 13 to extend through, and the through hole 382 is used to lock the corresponding hook 13. Each side plate 35 defines two spaced cutouts 372 to form an elastic plate 37 adjacent to the slot 39. A block 374 is formed at one side of the elastic plate 37, and a rib 376 is formed at an opposite side of the elastic plate 37 for touching the battery 50. The block 374 is received in the slot 39 and a protrusion 394 is formed in the slot 39 on the adjacent sidewall 33 facing the block 374. The slot 39 allows a corresponding tab 15 to extend through, and the protrusion 394 is engaged in the locking hole 156 of the corresponding tab 15.

To attach the frame 10 to the main housing 30, the hooks 13 and the tabs 15 are respectively inserted into the grooves 38 and the slot 39. The hooks 13 are respectively locked in the grooves 38 and the through holes 382. The locking holes 156 are respectively aligned with the protrusions 394. The battery 50 is then placed in the battery cavity 36 and resists the ribs 376. The blocks 374 respectively push the tabs 15 to move toward the protrusions 394, and the protrusions 394 are respectively engaged in the locking holes 156.

To detach the frame 10 from the main housing 30, the battery 50 is removed. The elastic plates 37 rebound to their original shape to allow the tabs 15 to be disengaged from the protrusions 394. The hooks 13 are pushed to disengage from the grooves 38 through the through holes 382, and the frame 10 can be detached from the main housing 30.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A fastening structure for a portable electronic device, the fastening structure comprising:
    a main housing defining a slot, a protrusion and a block formed on opposite sides of the slot; and
    a frame including a tab, the tab defining a locking hole, the block pushing the tab toward the protrusion to latch the protrusion in the locking hole for connecting the frame to the main housing.

2. The fastening structure as claimed in claim 1, wherein the tab comprises a oblique portion and a straight portion, and the locking hole is defined in the straight portion.

3. The fastening structure as claimed in claim 2, wherein an elastic plate is formed adjacent to the slot, and the block is formed at one side of the elastic plate.

4. The fastening structure as claimed in claim 3, wherein a rib is formed at another side of the elastic plate.

5. The fastening structure as claimed in claim 4, wherein a slot is positioned at each side of the main housing, and there are two tabs corresponding to the two slots.

6. The fastening structure as claimed in claim 5, wherein the main housing further comprises two opposite sidewalls, a side plate are positioned adjacent to each sidewall, each protrusion is formed on the corresponding sidewall, and each block is formed on the corresponding side plate.

7. The fastening structure as claimed in claim 6, wherein each side plate defines two cutouts to form the elastic plate.

8. The fastening structure as claimed in claim 7, wherein the main housing defines a groove between each sidewall and the adjacent side plate, each sidewall defines a through hole communicating to the corresponding groove, and the frame includes two hooks locked in the grooves and the through holes.

9. The fastening structure as claimed in claim 8, wherein a bar is formed at a bottom of each hook.

10. A portable electronic device, comprising:
a main housing including an elastic plate and a slot adjacent to the elastic plate, a block formed at one side of the elastic plate;
a protrusion formed in the slot, and facing the block; and
a frame including a tab defining a locking hole, the block pushing the tab toward the protrusion and the protrusion latched in the locking hole for connecting the frame to the main housing.

11. The portable electronic device as claimed in claim 10, wherein the tab comprises a oblique portion and a straight portion, and the locking holes are defined in the straight portions.

12. The portable electronic device as claimed in claim 10, wherein a rib is formed at another side of the elastic plate.

13. The portable electronic device as claimed in claim 12, wherein the main housing further comprises a sidewall, the elastic plate is positioned adjacent to the sidewall, the slot is formed between the sidewall and the elastic plate, and the protrusion is formed on the sidewall.

14. The portable electronic device as claimed in claim 13, wherein there are two sidewalls and two elastic plates, the sidewalls are positioned at two opposite sides of the main housing.

15. The portable electronic device as claimed in claim 14, wherein the main housing defines two grooves, each sidewall defines a through hole communicating to the corresponding groove, and the frame includes two hooks locked in the grooves and the through holes.

16. The portable electronic device as claimed in claim 15, wherein a bar is formed at a bottom of each hook.

17. A portable electronic device, comprising:
a main housing including a sidewall, an elastic plates positioned adjacent to the sidewall, a slot formed between the elastic plate and the sidewall, and a block formed at one side of the elastic plate;
a protrusion formed on the sidewall and positioned in the slot, and facing the block; and
a frame including a tab defining a locking hole, the block pushing the tab toward the protrusion and the protrusion latched in the locking hole for connecting the frame to the main housing;
wherein the main housing defines a groove, the sidewall defines a through hole communicating to the groove, the frame includes a hook locked in the groove and the through hole.

18. The portable electronic device as claimed in claim 17, wherein a rib is formed at another side of the elastic plate.

19. The portable electronic device as claimed in claim 17, wherein a bar is formed at a bottom of each hook.

* * * * *